United States Patent
Abe et al.

(10) Patent No.: US 8,598,868 B2
(45) Date of Patent: Dec. 3, 2013

(54) GASKET FOR SEALING VALVE OR PIPE, DETERMINATION METHOD OF DETERIORATION AND DAMAGES OF GASKET, AND HIGH-PRESSURE GAS SUPPLYING EQUIPMENT

(75) Inventors: Tomonobu Abe, Kai (JP); Shigeru Tsuchiya, Kai (JP); Shigeru Hayashida, Kofu (JP)

(73) Assignee: Taiyo Nippon Sanso Corporation, Tokyo (JP)

( * ) Notice: Subject to any disclaimer, the term of this patent is extended or adjusted under 35 U.S.C. 154(b) by 437 days.

(21) Appl. No.: 12/305,246

(22) PCT Filed: May 30, 2007

(86) PCT No.: PCT/JP2007/061006
§ 371 (c)(1),
(2), (4) Date: Dec. 17, 2008

(87) PCT Pub. No.: WO2007/148515
PCT Pub. Date: Dec. 27, 2007

(65) Prior Publication Data
US 2009/0199659 A1  Aug. 13, 2009

(30) Foreign Application Priority Data
Jun. 20, 2006  (JP) .................. 2006-169901

(51) Int. Cl.
*G01R 33/00* (2006.01)
*G01N 27/82* (2006.01)
(52) U.S. Cl.
USPC ........................................ 324/203; 324/240

(58) Field of Classification Search
USPC ............................................. 324/203
See application file for complete search history.

(56) References Cited

U.S. PATENT DOCUMENTS

| 5,423,222 | A  | * | 6/1995 | Rudd et al. ........................ 73/779 |
| 6,527,825 | B1 | * | 3/2003 | Gruenbauer et al. ........... 75/362 |
| 6,927,058 | B1 | * | 8/2005 | Dupont ........................ 435/287.4 |
| 7,390,580 | B1 | * | 6/2008 | Dupont ........................ 428/692.1 |

FOREIGN PATENT DOCUMENTS

| CN | 1342320 A | 3/2002 |
| CN | 1361035 A | 7/2002 |
| JP | 54-061243 | 5/1979 |
| JP | 61-069250 | 5/1986 |

(Continued)

OTHER PUBLICATIONS

Bonding, Sealing, Potting/Encapsulation and Coating With RTV Silicone Rubber Compounds, Wacker Silicones, Elastosil, obtained from http://www.wacker.com/cms/media/publications/downloads/6019_EN.pdf, obtained on Nov. 18, 2011, 38 pages.*

(Continued)

*Primary Examiner* — Patrick Assouad
*Assistant Examiner* — David M. Schindler
(74) *Attorney, Agent, or Firm* — Nixon & Vanderhye, PC

(57) ABSTRACT

A gasket according to the present invention is for sealing a valve or pipe used in a high-pressure gas supplying equipment, which is comprised of a polymer material containing magnetic particles. Also, in a determination method of deterioration and damages of a gasket according to the present invention, the aforementioned gasket is used as the gasket for sealing a valve or pipe in a high-pressure gas supplying equipment, and the magnetic force of the gasket is measured to determine the deterioration and the damages of the gasket.

3 Claims, 1 Drawing Sheet

(56) References Cited

FOREIGN PATENT DOCUMENTS

| | | | | |
|---|---|---|---|---|
| JP | 2-140508 | | 5/1990 | |
| JP | 03-203931 | | 9/1991 | |
| JP | 04-304283 | | 10/1992 | |
| JP | 2816783 | | 8/1998 | |
| JP | 11-269454 | | 10/1999 | |
| JP | 11-344119 | | 12/1999 | |
| JP | 2001-056236 | | 2/2001 | |
| JP | 2004-217821 | | 8/2004 | |
| JP | 2005-133744 | | 5/2005 | |
| RU | 1827484 | A1 * | 7/1993 | ............... F16J 15/40 |
| SU | 1642323 | A * | 4/1991 | .............. F15B 19/00 |

OTHER PUBLICATIONS

International Search Report for PCT/JP2007/061006 mailed Aug. 28, 2007.
Notification of the First Office Action and text of First Office Action in CN 200780022693.2 issued Jul. 26, 2011.
Notice of Allowance and English Translation for corresponding Japanese Application No. 2006-169901, Mailed Feb. 14, 2012, 6 pages.
Chinese Office Action and English Translation for corresponding Chinese Application No. 200780022693.2, mailed Apr. 12, 2012, 9 pages.

* cited by examiner

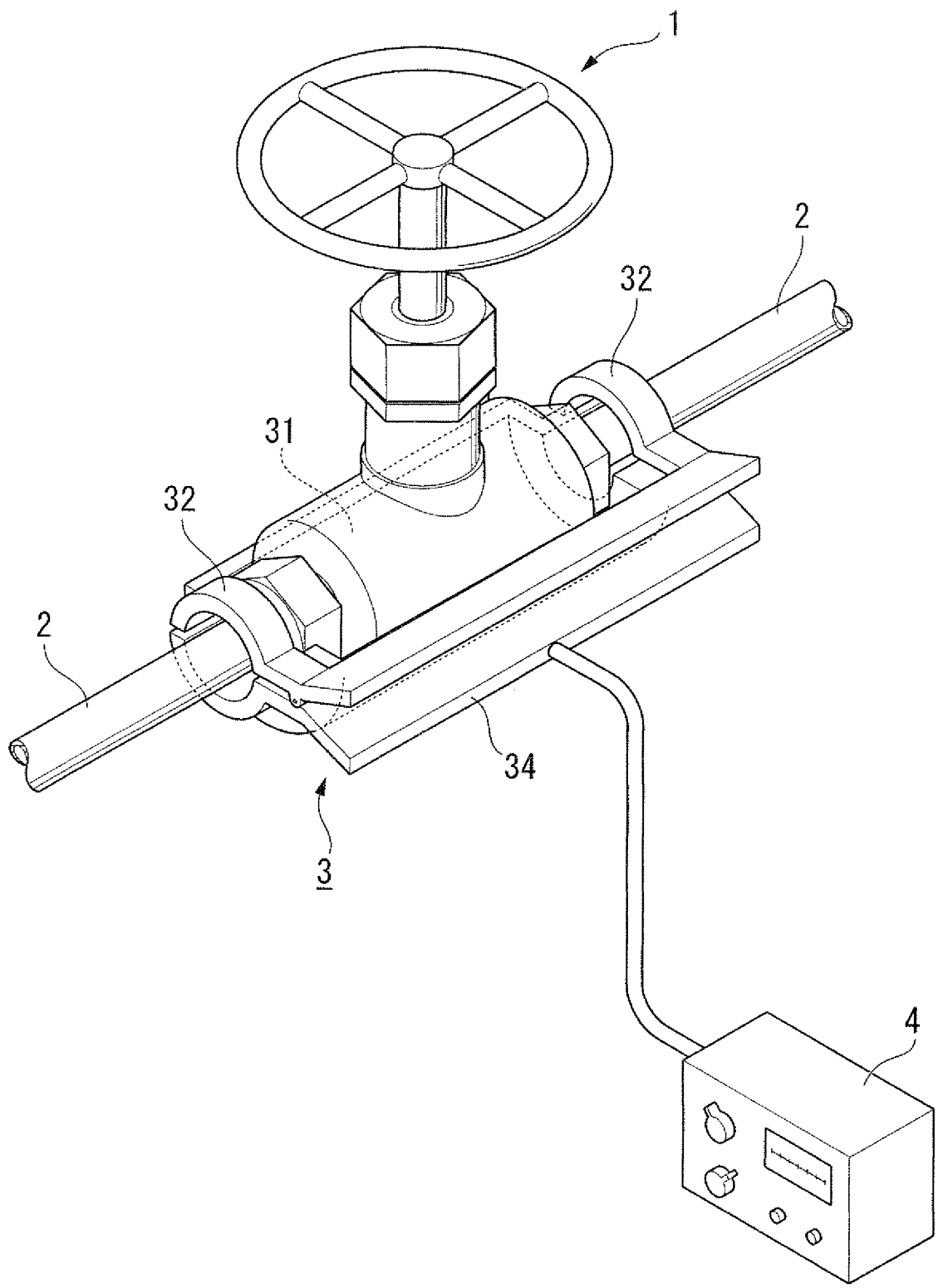

GASKET FOR SEALING VALVE OR PIPE, DETERMINATION METHOD OF DETERIORATION AND DAMAGES OF GASKET, AND HIGH-PRESSURE GAS SUPPLYING EQUIPMENT

This application is the U.S. national phase of International Application No. PCT/JP2007/061006 filed 30 May 2007 which designated the U.S. and claims priority to Japanese Patent Application No. 2006-169901 filed 20 Jun. 2006, the entire contents of each of which are hereby incorporated by reference.

TECHNICAL FIELD

The present invention relates to a gasket used in a valve or pipe. Moreover, the present invention relates to a determination method in which the gasket is used, and the thermal deterioration and thermal damages of the gasket is determined by the change in the magnetic force of magnetic particles.

BACKGROUND ART

Regarding a gasket used in a valve or pipe of a high-pressure gas supplying equipment, there is a concern that deterioration and damages occur, through the long-term use thereof, due to the increase in the temperature of gas in a pipe, which is attributed to adiabatic compression and galling due to opening and closing of a valve, etc. Therefore, as disclosed in Japanese Unexamined Patent Application, First Publication No. Hei 11-344119, the development has been performed on a heat-resistant gasket with a metallic nonwoven fabric with less thermal deterioration.

Meanwhile, polymer material-based gaskets such as polytetrafluoroethylene (PTFE) and polychlorotrifluoroethylene (PCTFE) have good elasticity and restorative properties in comparison with metallic gaskets. Therefore, polymer material-based gaskets have good sealing properties, and are widely used for this purpose.

However, when used in a valve or pipe of a high-pressure gas supplying equipment, these polymer material-based gaskets are subjected to thermal deterioration and thermal damages due to the increase in the temperature of gas in a pipe, which is attributed to adiabatic compression due to rapid opening and closing of a valve. These thermal deterioration and thermal damages occur even in the case where high-pressure gas is an inert gas such as nitrogen or a rare gas, and are highly likely to occur particularly in a high-pressure gas supplying equipment using a combustion-assisting gas such as oxygen, fluorine, chloride, nitrous oxide ($N_2O$), or trifluoronitrogen ($NF_3$).

Conventional inspection methods of the thermal deterioration and thermal damages of a polymer material-based gasket include a method in which the thermal deterioration and thermal damages are checked during a periodical overhaul inspection, and a method in which gas lea or the abnormality of rotary torque of a valve is checked by the experienced judgment of a worker. In these methods, the inspection takes long time, and the probability of discovering the thermal deterioration and thermal damages of a gasket is low. Accordingly, these methods are inefficient.

Patent Document 1

Japanese Unexamined Patent Application, First Publication No. Hei 11-344119

DISCLOSURE OF INVENTION

Problems to be Solved by the Invention

An object of the present invention is to obtain a gasket that enables the deterioration and damages to be easily and efficiently determined without taking apart a valve or pipe. Moreover, other objects of the present invention are to obtain a determination method of the deterioration and damages and a high-pressure gas supplying equipment, the both using the aforementioned gasket.

Means to Solve the Problems

In order to achieve the aforementioned objects,

The first aspect of the present invention is a gasket for sealing a valve or pipe used in a high-pressure gas supplying equipment, which is comprised of a polymer material containing magnetic particles.

The second aspect of the present invention is a determination method of deterioration and damages of a gasket, wherein the gasket according to the first aspect is used as the gasket for sealing a valve or pipe in a high-pressure gas supplying equipment, and the magnetic force of the gasket is measured to determine the deterioration and damages of the gasket. In the present invention, a material of the valve or pipe is preferably a nonmagnetic metal.

The third aspect of the present invention is a high-pressure gas supplying equipment including: a valve or pipe; and a gasket, wherein a material of the valve or pipe is a nonmagnetic metal, and the gasket according to the first aspect is used in the valve or pipe.

Effect of the Invention

According to the present invention, a magnetic field is preliminarily applied to the gasket, to thereby magnetize the magnetic particles, and the magnetic force of the magnetic particles within the gasket is measured. Accordingly, the existence of the deterioration and damages can be determined without taking apart a valve or pipe.

BRIEF DESCRIPTION OF THE DRAWINGS

FIG. 1 is a schematic diagram representing an apparatus used for a determination method of the present invention.

DESCRIPTION OF THE REFERENCE SYMBOLS 1 represents a valve; 2 represents a magnetic coiled body; and 4 represents a magnetic measuring instrument.

BEST MODE FOR CARRYING OUT THE INVENTION

A gasket of the present invention is formed by adding and dispersing magnetic particles in a polymer material. Herein, a polymer material refers to a thermoplastic polymer excellent in heat resistance, mechanical strength, and chemical resistance, and examples thereof include polytetrafluoroethylene (PTFE), polychlorotrifluoroethylene (PCTFE), nylon 66, tetrafluoroethylene-perfluoroalkyl vinyl ether copolymer, tetrafluoroethylene-hexafluoropropylene copolymer, tetrafluoroethylene-ethylene copolymer, and a fluorine-containing rubber.

Moreover, as the magnetic particle used in the present invention, the following can be used: magnetic materials such as a ferrite which is a metal or oxide, a chromite, a manganite, a garnet type oxide, a hexagonal crystal magnetoplumbite type oxide (which includes oxides containing $Fe^{3+}$ ion or a divalent metal ion such as $Mn^{2+}$, $Ba^{2+}$, $Sr^{2+}$, or $Pb^{2+}$; and structures such as M type, W type, Y type, and Z type), and an intermetallic compound (a compound in which metal elements are bonded at a ratio of integers). The average particle diameter of magnetic materials is usually within the range from 10 nm to 100 μm, preferably from 10 nm to 10 μm, and more preferably from 100 nm to 10 μm.

The quantity of the magnetic particles added in the polymer material may be within the appropriate range so that the properties of the gasket are maintained and the magnetic field of the gasket can be measured by the detection method described below. For example, the specific quantity can be, based on 100 parts by weight of the polymer material, within the range from 5 to 50 parts by weight, and preferably from 10 to 25 parts by weight. By using the magnetic particles within the aforementioned quantity range, the strength of the magnetic field of the gasket can be measured sufficiently.

The production of the gasket is performed by a method in which the magnetic particles are mixed at a specified quantity with the granular or powdery polymer material, and the mixture is molded by a molding method such as an injection molding method, to thereby obtain a gasket in a shape such as a ring shape. In addition, in order to improve the mechanical strength, reinforcement fibers such as glass fibers or carbon fibers can be dispersed in the gasket so that the reinforcement fibers are present within the gasket.

In general, a magnetic material has the property that the magnetism is lost when it is heated above a certain temperature, and this temperature is called a "Curie temperatures."

The present invention makes use of this property of the magnetic material. In other words, when the magnetic particles are contained within the gasket, the strength of the magnetic field is lowered by subjecting the gasket with the heat whose temperature is higher than a Curie temperature. Therefore, by measuring the strength of the magnetic field at ordinary temperature, it is possible to determine whether the gasket is subjected to the heat whose temperature is higher than a Curie temperature and to the thermal deterioration and thermal damages.

Tables 1 to 7 show Curie temperatures of various metals, ferrites, and intermetallic compound, etc. From these Tables, it is found that there are various magnetic particles having a Curie temperature ranging from about 120° C. to over 500° C. The ignition temperature of the polymer material is usually 500° C. or less, and therefore, it is necessary to select the magnetic particle whose Curie temperature is no more than the ignition temperature.

TABLE 1

| Materials | Curie temperatures [° C.] |
|---|---|
| Fe: iron | 767 |
| Co: cobalt | 1122 |
| Ni: nickel | 355 |

TABLE 2

| Ferrites ($MFe_2O_4$) | $M^{2+}$ | Curie temperatures [° C.] |
|---|---|---|
| Manganese ferrite | Mn | 300 |
| Magnesium ferrite | Mg | 440 |

TABLE 2-continued

| Ferrites ($MFe_2O_4$) | $M^{2+}$ | Curie temperatures [° C.] |
|---|---|---|
| Cupper ferrite (rapid cooling) | Cu | 455 |
| Cobalt ferrite | Co | 520 |
| Gamma ferrite | $\gamma$-$Fe_2O_3$ | 575 |
| Nickel ferrite | Ni | 585 |
| Lithium ferrite | Li | 670 |

TABLE 3

| Metals $R^{3+}$ | Curie temperatures [° C.] |
|---|---|
| Y: yttrium | 287 |
| Sm: samarium | 305 |
| Eu: europium | 293 |
| Gd: gadolinium | 291 |
| Tb: terbium | 295 |
| Dy: dysprosium | 290 |
| Ho: holmium | 294 |
| Er: erbium | 283 |
| Tm: thulium | 276 |
| Yb: ytterbium | 275 |
| Lu: lutetium | 266 |

TABLE 4

| Types | Materials | Curie temperatures [° C.] |
|---|---|---|
| M type | BaM | 450 |
| M = $BaFe_{12}O_{19}$ | PbM | 452 |
| | SrM | 460 |
| | CaM | 445 |
| | $Na_{0.5}La_{0.5}M$ | 440 ± 10 |
| | $Ag_{0.5}La_{0.5}M$ | 435 |
| W type | $Mn_2W$ | 415 |
| W = $BaM'_2Fe_{16}O_{27}$ | $Fe_2W$ | 455 |
| (M' = $M^{2+}$: a divalent | NiFeW | 520 |
| metal ion) | ZnFeW | 430 |
| | $Ni_{0.5}Zn_{0.5}FeW$ | 450 |
| Y type | $Mn_2Y$ | 290 |
| Y = $BaM'_2Fe_{12}O_{22}$ | $Co_2Y$ | 340 |
| (M' = $M^{2+}$: a divalent | $Ni_2Y$ | 390 |
| metal ion) | $Mg_2Y$ | 280 |
| Z type | $Co_2Z$ | 410 |
| Z = $Ba_3M'_2Fe_{24}O_{41}$ | $Cu_2Z$ | 440 |
| (M' = $M^{2+}$: a divalent | $Zn_2Z$ | 360 |
| metal ion) | | |

TABLE 5

| Materials | Curie temperature [° C.] |
|---|---|
| $Zr_3Fe_2$ | 315 |
| $HfFe_2$ | 318 |
| $FeBe_2$ | 550 |
| $YFe_2$ | 277 |
| $CeFe_2$ | 605 |
| $SmFe_2$ | 401 |
| $GdFe_2$ | 540 |
| $DyFe_2$ | 390 |
| $HoFe_2$ | 335 |
| $ErFe_2$ | 200 |
| $TmFe_2$ | 340 |
| $YCo_5$ | 648 |
| $LaCo_5$ | 567 |
| $CeCo_5$ | 374 |
| $FrCo_5$ | 612 |
| $SmCo_5$ | 724 |

TABLE 5-continued

| Materials | Curie temperature [° C.] |
|---|---|
| Sm$_2$Co$_{17}$ | 647 |
| Gd$_2$Co$_{17}$ | 657 |
| Th$_2$Co$_{17}$ | 780 |
| ThCo$_5$ | 142 |
| Th$_2$Fe$_7$ | 297 |
| Th$_2$Fe$_3$ | 152 |
| Ni$_{13}$Mn | 477 |
| FeCo | 1117 |
| Nu$_{13}$Fe | 710 |
| CrPt$_3$ | 414 |
| FePd | 476 |
| FePd$_3$ | 256 |
| Fe$_3$Pt | 157 |
| FePt | 477 |

TABLE 6

| Types | Materials | Curie temperatures [° C.] |
|---|---|---|
| Boride | Co$_3$B | 474 |
| | Co$_2$B | 160 |
| | Fe$_2$B | 742 |
| | MnB | 305 |
| | FeB | 325 |
| | Co$_{20}$Al$_3$B$_6$ | 133 |
| | Co$_{21}$Ge$_2$B$_6$ | 238 |
| | Mn$_3$SiB$_2$ | 125 |
| Carbide | Fe$_3$C | 210 |
| | Fe$_2$C (crystal structure: hexagonal crystal) | 380 |
| | Fe$_2$C (crystal structure: orthorhombic crystal) | 247 |
| | Co$_2$Mn$_2$C | 460 |
| Silicide | Fe$_3$Si | 550 |
| | Co$_2$MnSi | 712 |
| Nitride | Mn$_4$N | 465 |
| | Fe$_4$N | 488 |
| | Fe$_8$N | 300 |
| | Mn$_4$N$_{0.75}$C$_{0.25}$ | 577 |
| | Mn$_4$N$_{0.5}$C$_{0.5}$ | 626 |
| | Fe$_3$NiN | 760 |
| | Fe$_3$PtN | 367 |
| | Fe$_2$N$_{0.78}$ | 125 |
| Phosphide | Fe$_{2.4}$Mn$_{0.6}$P | 407 |
| | Fe$_3$P | 443 |
| | Fe$_{2.25}$Ni$_{0.75}$P | 252 |
| | Fe$_{2.4}$Mn$_{0.6}$P | 397 |

TABLE 7

| Types | Materials | Curie temperatures [° C.] |
|---|---|---|
| Sb compound | MnSb | 313 |
| | CoMnSb | 217 |
| | NiMnSb | 477 |
| | PdMnSb | 227 |
| | Ni$_{1.6}$MnSb | 197 |
| | Ni$_{2.0}$MnSb | 137 |
| | NiCoSb | 557 |
| Al compound | Fe$_3$Al | 477 |
| | Cu$_2$MnAl | 337 |
| In compound | Mn$_3$In | 310 |
| | Cu$_2$MnIn | 227 |
| Ge compound | Fe$_3$Ge (hexagonal crystal) | 367 |
| | Fe$_3$Ge (cubic crystal) | 487 |
| | FeNiGe | 497 |
| | Mn$_{3.4}$Ge | 597 |

TABLE 7-continued

| Types | Materials | Curie temperatures [° C.] |
|---|---|---|
| Sn compound | Fe$_3$Sn | 470 |
| | Fe$_{1.67}$Sn | 280 |
| | Fe$_3$Sn$_2$ | 339 |
| | NiCoSn | 557 |
| | Co$_2$MnSn | 538 |
| Sulfide | Fe$_7$S$_8$ | 305 |
| | CuCr$_2$S$_4$ | 147 |
| | Fe$_3$S$_4$ | 307 |
| Se compound | Fe$_7$Se$_8$ | 176 |
| | CuCr$_2$Se$_4$ | 187 |

TABLE 8

| Polymer materials | Ignition temperature [° C.] | |
|---|---|---|
| | (in oxygen, at atmospheric pressure) | (in oxygen, at about 10 MPa) |
| PTFE | 507 to 529 | 434 |
| PCTFE | 470 | 388 |
| Nylon 66 | >395 | 259 |

Table 8 shows the ignition temperatures of the major polymer materials. It can be seen from this Table 8 that even polytetrafluoroethylene having the highest heat resistance should be combined with the magnetic particles having a Curie temperature of 500° C. or less.

When the temperature, at which the aforementioned polymer material thermally deteriorates, is 450° C. for example, the gasket, in which the magnetic particles having a Curie temperature of 450° C. are added, should be used. Then, when the strength of the magnetic field of the gasket has been lowered, it can be estimated that the gasket was subjected to the heat hysteresis having 450° C. or more, to thereby causing the thermal deterioration or thermal damages.

Moreover, when the temperature, at which the aforementioned polymer material thermally deteriorates, is 350° C. for example, the gasket, in which the magnetic particles having a Curie temperature of 350° C. are added, should be used. Then, when the magnetic force of the gasket has been lowered, it can be estimated that the gasket was subjected to the heat hysteresis having a temperature of 350° C. or more.

In a determination method of deterioration and damages of a gasket according to the present invention, the aforementioned gasket is used as the gasket for scaling a valve or pipe in a high-pressure gas supplying equipment, and the strength of the magnetic field of the gasket is measured, and the change in the strength is used to determine the thermal deterioration and thermal damages of the gasket.

For example, the valve equipped with the aforementioned gasket is connected to the plumbing of a high-pressure gas supplying equipment, and the strength of the magnetic field of the gasket used in the valve is preliminarily measured and recorded before the use. After the use, the strength of the magnetic field attributed to the gasket of the valve is measured during a periodic inspection of the high-pressure gas supplying equipment. In the measurement, it is necessary that the both measurement positions are identical.

When the measured strength of the magnetic field has been largely lowered, for example lowered within the range from one tenth to half of the strength of the magnetic field before the use, it is determined that the gasket was subjected to the heat hysteresis having a temperature that is no less than the Curie temperature of the magnetic particles added therein. In addition, it is estimated that the gasket is likely to be subjected the thermal deterioration and thermal damages. When the magnetism is not detected at all, it is estimated that the gasket itself has been lost. In this case, the gasket is replaced according to need.

Herein, when a pipe is equipped with the aforementioned gasket, the thermal deterioration and thermal damages can be estimated.

In this determination method, needless to say, it is necessary to use the valve and pipe formed of a nonmagnetic metal such as stainless steel other than ferritic stainless steel, an aluminum alloy, or a copper alloy, so as to prevent the adverse effects from being exerted on the change in magnetism attributed to the gasket.

Accordingly, in the determination method of the present invention, the existence of the deterioration and damages of the gasket can be estimated without taking apart a valve or pipe.

FIG. 1 represents an example of a measurement apparatus used for the determination method.

In FIG. 1, the reference symbol 1 represents a valve. This valve 1 is an on-off valve having a well-known structure, and is made of a copper alloy. The gasket of the present invention is used as the gasket of this valve 1. The pipes 2, 2 are connected to this valve 1, which constitutes a part of the high-pressure gas supplying equipment.

The magnetic coiled body 3 is placed outside and below the valve 1. Also, the magnetic coiled body 3 is close to the valve 1. The magnetic coiled body 3 includes the semicylinder-shaped bottom part 31, a pair of the semicircular movable arm parts 32, 32 that are provided at the both ends in the longitudinal direction of the bottom part 31, and the pushing part 34 provided on one side of the bottom part 31.

The pushing part 34 is formed so that the movable arm parts 32, 32 are constantly biased in the closing direction by a spring that is not illustrated. The movable arm parts 32, 32 are opened by pushing the pushing part 34. Also, the pipes 2, 2 are sandwiched therebetween so that the valve 1 can be fixed at the central portion of the bottom part 31. In addition, an induction coil and a pick-up coil are incorporated in the bottom part 31.

The magnetic coiled body 3 is connected with the magnetic measuring instrument 4. This magnetic measuring instrument 4 includes the power source section that flows an electric current into the induction coil of the magnetic coiled body 3 so as to form a magnetic field, and the measurement section that detects, using the pick-up coil, an electromotive force generated when the aforementioned gasket is present in the formed magnetic field, and measures the induction voltage.

Then, before the use of the valve 1, as shown in FIG. 1, the valve 1 is equipped with the magnetic coiled body 3, and the strength of the magnetic field attributed to the magnetic particles within the gasket in the valve 1 is measured with the magnetic measuring instrument 4, followed by recording the value thereof.

Subsequently, during a periodic inspection, etc. after the use of the valve 1, the magnetic coiled body 3 is placed at the same position of the valve 1, and the strength of the magnetic field attributed to the magnetic particles is measured with the magnetic measuring instrument 4.

When the measured strength of the magnetic field has been largely lowered, for example lowered within the range from one tenth to half of the strength of the magnetic field before the use, it is determined that the gasket was subjected to the heat hysteresis having a temperature that is no less than the Curie temperature of the magnetic particles added therein.

In a high-pressure gas supplying equipment, the valve and pipe formed of a nonmagnetic metal such as stainless steel other than ferritic stainless steel, an aluminum alloy, or a copper alloy are used as the valve and pipe that constitute the equipment, and the gasket formed of the polymer material, in which the aforementioned magnetic particles are dispersed, are used as the gasket of the valve and pipe.

INDUSTRIAL APPLICABILITY

According to the present invention, the existence of the deterioration and damages of the gasket can be estimated without taking apart a valve or pipe. A cost required for equipment maintenance can be reduced. Accordingly, the present invention is industrially useful.

The invention claimed is:

1. A determination method of deterioration and damages of a gasket, comprising:
    using the gasket for sealing a valve or pipe in a high-pressure gas supplying equipment, said gasket comprising a polymer material containing a magnetic particle, the Curie temperature of the magnetic particle being no more than an ignition temperature of the polymer material, and being 500° C. or less;
    measuring magnetic forces of the gasket before and after the gasket has contacted a high-temperature gas; and
    comparing the measured magnetic forces so as to determine whether the gasket was subjected to a heat hysteresis having a temperature being no less than the Curie temperature of the magnetic particle.

2. A determination method of deterioration and damages of a gasket according to claim 1, wherein a material of the valve or pipe is a nonmagnetic metal.

3. A determination method of deterioration and damages of a gasket according to claim 1, wherein if the magnetic force of the gasket after the gasket has contacted the high-temperature gas is within the range from one tenth to half of the magnetic force of the gasket before the gasket has contacted the high-temperature gas, then it is determined that the gasket was subjected to the heat hysteresis having the temperature being no less than the Curie temperature of the magnetic particle.

* * * * *